(12) United States Patent
Ahmed et al.

(10) Patent No.: US 6,437,039 B1
(45) Date of Patent: Aug. 20, 2002

(54) ONE-PART ORGANOPOLYSILOXANE RUBBER COMPOSITION FOR USE AS A PROTECTION COATING

(75) Inventors: Farooq Ahmed, Guelph; Faisal Huda; Seraj ul Huda, both of Toronto; John Barr, Eden Mills, all of (CA)

(73) Assignee: CSL Silicones Inc., Guelph (CA)

( * ) Notice: Subject to any disclaimer, the term of this patent is extended or adjusted under 35 U.S.C. 154(b) by 0 days.

(21) Appl. No.: 09/537,664

(22) Filed: Mar. 29, 2000

(51) Int. Cl.$^7$ .................................................. C08K 3/34
(52) U.S. Cl. ........................ 524/492; 524/261; 524/264; 524/265; 524/266; 524/493
(58) Field of Search ................................ 524/261, 264, 524/265, 266, 492, 493

(56) References Cited

U.S. PATENT DOCUMENTS

| | | |
|---|---|---|
| 4,996,112 A | 2/1991 | Perrin et al. |
| 5,130,401 A | 7/1992 | Arai et al. |
| 5,290,601 A | 3/1994 | Brooks et al. |
| 5,468,825 A | 11/1995 | Takrada et al. |
| 5,681,914 A | 10/1997 | Kobayashi et al. |
| 5,880,227 A | 3/1999 | Kobayashi et al. |

Primary Examiner—Edward J. Cain

(57) ABSTRACT

The present invention relates to a one-part room temperature vulcanizable organopolysiloxane rubber composition which crosslinks in the presence of moisture to form a coating for the corrosion protection of metals. The one-part organopolysiloxane rubber composition comprises the product which is obtained by mixing the following:

a) from about 20 to about 98 weight percent of one or more polydiorganosiloxane fluids of the formula R"[(R)$_2$SiO]$_n$R' in which R is a monovalent alkyl or alkylene radical having 1 to 8 carbon atoms or a phenyl radical, R' is a monovalent alkyl or alkylene radical having 1 to 8 carbon atoms or a phenyl radical, R" is OH or a monovalent alkyl or alkylene radical having 1 to 8 carbon atoms or a phenyl radical and n has an average value such that the viscosity is from about 1 to about 100,000 centipoise at 25° C., wherein at least one of the polyorganosiloxane fluid has R" equal to OH and n has an average value such that the viscosity is in the range from 1,000 to 100,000 centipoise at 25° C., preferably from 3,000 to 40,000 centipoise at 25° C.;

b) from 0 to about 40 weight percent of a cyclo-organosiloxane of the formula

[(R)$_2$SiO]$_n$ in which R is a monovalent alkyl or alkylene radical having 1 to 8 carbon atoms or a phenyl radical which may optionally be substituted with an alkyl radical having 1 to 8 carbon atoms and n has an average value of 3 to 10 c) from 0 to about 40 weight percent of an inorganic extending or non-reinforcing filler d) from about 0.5 to about 10 weight percent of an amorphous SiO$_2$ reinforcing filler having a surface area of between about 100 to 250 m$^2$/g and a particle size range between about 0.01 and 0.03 microns;

e) from about 1 to about 7 weight percent of an oximinosilane cross-linking agent of the formula;

RSi (ONR'$_2$)

in which R and R' are independently selected from monovalent alkyl or alkylene radicals having 1 to 8 carbon atoms or a phenyl radical which may optionally be substituted with an alkyl radical having 1 to 8 carbon atoms;

f) from about 0.2 to about 3 weight percent of an adhesion promoter of the formula R$^3{}_b$ (R$^2$O)$_{3-b}$SiR$^1$ in which R$^2$ and R$^3$ are independently selected from monovalent alkyl or alkylene radicals having 1 to 8 carbon atoms or a phenyl radical which may optionally be substituted with an alkyl radical having 1 to 8 carbon atoms, b is an integer between 0 and 3, and R$^1$ is a saturated, unsaturated or aromatic hydrocarbon radical having 1 to 10 carbon atoms which may optionally contain a functional group; and g) from about 0.02 to about 3 weight percent of an organotin salt as a condensation catalyst.

20 Claims, No Drawings

ONE-PART ORGANOPOLYSILOXANE RUBBER COMPOSITION FOR USE AS A PROTECTION COATING

FIELD OF THE INVENTION

This invention relates to a one-part room temperature vulcanizable organopolysiloxane rubber composition that does not contain volatile organic compounds (VOC) and which crosslinks in the presence of moisture to form a coating for use to protect a surface from environmental effects such as a corrosion protection, waterproofing, antifouling or weathering protection of surfaces, or for secondary containment of liquid spills, or high voltage insulator coating.

BACKGROUND OF THE INVENTION

The protection of surfaces against environmental effects is important in many different applications. For example, metal and other surfaces such as concrete exposed to moisture such as rain or fog in combination with contaminated atmospheres as are found in industrial locations may be subject to extensive corrosion unless protected in some way from exposure to the corrosive atmosphere. Other potentially corrosive environments include along sea coasts where salt spray is found and in areas where agricultural chemicals are widely distributed. In addition, metal and concrete surfaces directly exposed to water such as marine structures and vessels are also subject to the potential for extensive corrosion. Currently, such surfaces are most commonly protected by being painted with alkyd based paints. Such paints form a relatively rigid coating on the surface which can become brittle and when subjected to stress, can flake or chip off, thereby exposing the underlying surface to the corrosive elements. In addition, such paints generally are susceptible to UV damage thereby further reducing their effective life.

Two-part organopolysiloxane rubber compositions for use as a corrosion protection coating on metals have been developed. For example, Lampe describes in U.S. Pat. No. 4,341,842 a two-part room temperature vulcanizable composition for coating the underside of vehicles to protect the metal from rusting or being corroded by road salts or other similar compounds. However, such two-part compositions have a major disadvantage in that they require the use of complex dual mixing and spray nozzle apparatus or require pre-mixing and immediate use on site when used with conventional spray equipment. If conventional spray equipment is used, the amount of material pre-mixed must also be exact to prevent wastage as the composition has a finite pot life.

One part compositions for coating of surfaces have also been described. Such compositions generally utilize a volatile organic solvent such as petroleum naphtha, toluene, petroleum ether and chlorinated hydrocarbons as a diluent to improve the working efficiency and ease of application of the coating composition. If no solvent is utilized, the coating compositions are difficult to apply due to high viscosity. The use of solvent creates environmental pollution and potential danger to the health of workers as it evaporates.

Yaginurua et al in U.S. Pat. No. 5,445,873 describe a solventless coating that cures at room temperature through a condensation reaction. The coating is designed for packaging circuit boards and does not require high physical strength. The composition utilizes a low molecular weight organopolysiloxane with a viscosity in the range of 20 to 500 centipoise.

Another solventless coating composed of silicone resin and polydiorgano-silicone fluid has been described in U.S. Pat. No. 4,780,338. The coating requires elevated temperatures for curing which requires the heating of the substrate or oven drying after the coating is applied.

U.S. Pat. No. 4,929,703 also describes a solventless coating composed of A) silicone resin reaction product prepared by hydrolyzing, then neutralizing an equilibrated mixture of a silane and a diorganopolysiloxane, B) a silane and C) diorganopolysiloxane fluid. The coating cures when exposed to moisture as a result of condensation reaction of siloxane to form a matrix.

Many other applications where silicone coatings are used include waterproofing, anti fouling, protection of underground pipes and high voltage insulating coatings among others. Such applications generally use either a one part or two part composition as described above, which are subject to the same problems. There still remains a need for a one part room temperature vulcanizable silicone coating composition which is easily applied to surfaces as a protective coating and which does not contain volatile organic compounds (VOC).

The term VOC mainly refers to the hydrocarbons but may also include other compounds. The VOC's that are of most concern and the use of which has been regulated worldwide are those which participate in photochemical reactions and result in toxic oxidates.

SUMMARY OF THE INVENTION

The present invention provides a VOC free, one part room temperature vulcanizable coating for easy and convenient application by conventional methods such as dipping, flow or spraying. The coating provides a guard against environmental effects along with high physical strength and adhesion achieved with a suitable blend of reinforcing and extending fillers.

In one aspect, the present invention provides for a one-part room temperature vulcanizing organopolysiloxane rubber composition for use as a protection coating on surfaces. The composition comprises the product which is obtained by mixing the following:

a) from about 20 to about 98 weight percent of one or more polydiorganosiloxane fluids of the formula

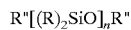
$$R''[(R)_2SiO]_nR''$$

in which R is a monovalent alkyl or alkylene radical having 1 to 8 carbon atoms or a phenyl radical, R' is a monovalent alkyl or alkylene radical having 1 to 8 carbon atoms or a phenyl radical, R'' is OH or a monovalent alkyl or alkylene radical having 1 to 8 carbon atoms or a phenyl radical and n has an average value such that the viscosity is from about 1 to about 100,000 centipoise at 25° C., wherein at least one of the polyorganosiloxane fluid has R'' equal to OH and n has an average value such that the viscosity is in the range from 1,000 to 100,000 centipoise at 25° C., preferably from 3,000 to 40,000 centipoise at 25° C.;

b) from 0 to about 40 weight percent of a cyclo-organosiloxane of the formula

$$[(R)_2SiO]_n$$

in which R is a monovalent alkyl or alkylene radical having 1 to 8 carbon atoms or a phenyl radical which may optionally be substituted with an alkyl radical having 1 to 8 carbon atoms and n has an average value of 3 to 10 c) from 0 to about 40 weight percent of an inorganic extending or non-reinforcing filler d) from about 0.5 to about 10 weight percent of an amorphous $SiO_2$ reinforcing filler having a surface area of between about 100 to 250 $m^2/g$ and a particle size range between about 0.01 and 0.03 microns;

e) from about 1 to about 7 weight percent of an oximinosilane cross-linking agent of the formula;

in which R and R' are independently selected from monovalent alkyl or alkylene radicals having 1 to 8 carbon atoms or a phenyl radical which may optionally be substituted with an alkyl radical having 1 to 8 carbon atoms;

f). from about 0.2 to about 3 weight percent of an adhesion promoter of the formula

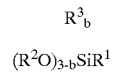

in which $R^2$ and $R^3$ are independently selected from monovalent alkyl or alkylene radicals having 1 to 8 carbon atoms or a phenyl radical which may optionally be substituted with an alkyl radical having 1 to 8 carbon atoms, b is an integer between 0 and 3, and $R^1$ is a saturated, unsaturated or aromatic hydrocarbon radical having 1 to 10 carbon atoms which may optionally contain a functional group; and g) from about 0.02 to about 3 weight percent of an organotin salt as a condensation catalyst.

In an aspect of the invention, the composition is for coating high voltage electrical insulators and further includes about 36 to about 48 weight percent of alumina trihydrate, the alumina trihydrate having a median particle size of 13 μm, containing 65.1 percent $Al_2O_3$, 34.5 percent combined $H_2O$, 0.3 percent $Na_2O$, 0.02 percent CaO, 0.01 percent $SiO_2$ and having a specific gravity of 2.42, the aluminum trihydrate being present in a proportion of 90 to 110 parts by weight per 100 parts by weight of the polyorganosiloxanes.

In an aspect of the invention, the composition is for coatings exposed to cathodic stress and to provide protection against cathodic disbandment. The composition includes 0.25 to 20 weight percent of a conductive filler, such as Zinc, Nickel or Copper powder, Carbon black and graphite, preferably zinc powder of average particle size 3 to 10 μm and having a specific gravity of 7.12. The proportion of conductive filler to the polymer is 1 to 27 parts by weight per 100 parts by weight of polyorganosiloxanes. The composition can be utilized protection against corrosion as well as Cathodic Disbondment in under ground installations such as pipes.

The present invention also provides for a method of protecting exposed surfaces particularly metal or concrete surfaces from environmental effects. The method comprises applying to the surface a thin layer of the above one-part organopolysiloxane rubber composition and allowing the layer of the one-part organopolysiloxane rubber composition to cure at room temperature to a silicone elastomer.

The present invention also provides for the surfaces coated with the silicone elastomer formed from the curing of the one-part organopolysiloxane rubber composition.

DETAILED DESCRIPTION OF THE INVENTION

The one-part organopolysiloxane rubber compositions of the present invention are ideally suited for protection of surfaces from environmental effects. Such protection includes corrosion protection of metal or concrete surfaces and structures against salt spray and chemical environments including direct exposure to salt water, salt fog, gases and other industrial pollutants. The compositions of the present invention can also be used to coat metal surfaces of motor vehicles which may be exposed to high salt condition during the winter season. The compositions with suitable additives also provide protection against the effects of weathering from exposure to among others UV radiation. The compositions of the present invention are particularly useful on marine installations, such as anti-fouling coatings of ship hulls, oil rigs, docks, piers, buoys, water intake pipes and various submerged structures. The coating composition of the present invention is also useful for coating electric transmission towers and bridges for corrosion protection of metal or concrete structures directly exposed to salt water and industrial pollution, especially sulfur based. The composition containing alumina trihydrate can be utilized as a protective coating on electrical insulators including ceramic and polymeric rubber insulation providing both corrosion and leakage current protection. The coating composition can also be utilized for forming an impervious layer by coating textiles such as Geo Tech or nylon, cotton or other fabrics to be used as chemical containment or as tents, awnings, canopies, etc. This invention fulfills the need for a protective coating encompassing all the above applications and which does not contain non silicone volatile organic components (VOCs) and further, displays superior adhesive properties, limiting the phenomenon of rust creep beneath the coating surface, as is common with conventional (epoxy, alkyd, acrylic, etc.) coatings.

The term Volatile Organic Compounds (VOCs) is mainly referred to hydrocarbons, but it also includes other volatile organic compounds. VOC emission in the environment can cause serious problems. The emitted VOCs can participate in photochemical reactions and result in toxic oxidants especially ozone. Organosiloxane are highly resistant to ultraviolet radiation and photodegradation 1,2. The volatile organosiloxanes are exempth under VOC regulations 3,4. Due to their stability against photodegradation and other environmental factors volatile organosiloxanes, such as cyclo-organosiloxane or linear-organosiloxane or a mixture of noth is used as solvent in this invention. The absence of volatile organic components (VOC) in the coating composition makes it ideal for use in contained areas where minimum levels of VOC is required.

The one-part organopolysiloxane rubber compositions of the present invention for use as a protective coating contain about 20 to about 98 weight percent of one or more polydimethylsiloxane fluids of the formula:

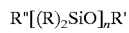

in which R is a monovalent alkyl or alkylene radical having 1 to 8 carbon atoms or a phenyl radical, R' is a monovalent alkyl or alkylene radical having 1 to 8 carbon atoms or a phenyl radical, R" is OH or a monovalent alkyl or alkylene radical having 1 to 8 carbon atoms or a phenyl radical and n has an average value such that the viscosity is from about 1 to about 100,000 centipoise at 25° C. At least one of the polyorganosiloxane fluids is a higher viscosity siloxane having reaction groups in which R" is equal to OH and n has an average value such that the viscosity is in the range from 1,000 to 100,000 centipoise at 25° C., preferably from 3,000 to 40,000 centipoise at 25° C. The polydimethylsiloxanes may contain small amounts of monomethylsiloxane units and methyl radical replaced with other radicals in small amounts as impurities such as is found in commercial products, but the preferred fluid contains only polydimethylsiloxane.

The composition may contain a second linear dimethyl polysiloxane of low molecular weight to act as a viscosity reducer for the composition for ease in applying the composition to the surface. The low molecular weight linear dimethyl polysiloxanes are end blocked oligomeric compounds of the above formula where R, R' and R" may be the same or different and are independently selected from a monovalent alkyl or alkylene radical having 1 to 8 carbon atoms or phenyl radical. The average value of n ranges between 4 and 24, preferably between 4 and 20.

If the composition contains the two different polysiloxanes set out above, the total of the polysiloxanes is generally about 40 to 98 weight percent with the relative amounts of the two polysiloxanes being selected based upon the desired characteristics of the final coating. Generally each of the polysiloxanes will be present in a ratio of from about 30 weight percent to about 70 weight percent based upon the total weight of the polysiloxane fluids.

In addition to, or in place of the low molecular weight linear dimethyl polysiloxanes, the composition may contain up to about 40 weight percent, more preferably 20 to 30 weight percent of a cyclo-organosiloxane of the formula:

$$[(R)_2SiO]_n$$

in which R is a monovalent alkyl or alkylene radical having 1 to 8 carbon atoms or a phenyl radical which may optionally be substituted with an alkyl radical having 1 to 8 carbon atoms and n has an average value of 3 to 10. The preferred cycloorganosiloxane is a cyclic dimethylsiloxane and is used in a similar manner to the low molecular weight linear dimethyl polysiloxanes to lower the viscosity of the composition for convenient application by spraying, brushing or dipping.

The composition may also contain up to 40 weight percent, more preferably 15 to 30 weight percent of inorganic extending or non-reinforcing fillers to increase the resistance of the coating to environmental effects, including high temperature stability of the cured product. The extending fillers are preferably selected from inorganic materials such as calcium carbonate, barium sulfate, iron oxide, diatomaceous earth, melamine, quartz, crystalline silica, titanium dioxide, alumina trihydrate, zinc oxide, zirconium oxide, chromic oxide, conductive fillers such as zinc, metal or copper powder, carbon black and graphite. The selection of the filler will be based upon the required properties and the final usage of the composition. Thus, for applications where high temperature resistance is not required, such as corrosion protection coating of electrical power systems, roof coatings, etc., the preferred filler will be calcium carbonate, diatomaceous earth or quartz. For applications where high temperature stability is required, such as coating exhaust pipes and mufflers of motor vehicles, the preferred filler will be melamine, iron oxide, zinc oxide, titanium dioxide, zirconium oxide or zinc chromate. For coating of underground pipes for protection against cathodic disbondment conductive fillers such as zinc, metal or copper powder, carbon black and graphite are used. For coatings requiring higher strength crystalline silica is utilized while for coatings for electrical insulators, the composition will contain alumina trihydrate to provide leakage current protection. In an aspect of the invention, the composition is for coating high voltage electrical insulators and further includes about 36 to about 48 weight percent of alumina trihydrate, the alumina trihydrate having a median particle size of 13 $\mu$m, containing 65.1 percent $Al_2O_3$, 34.5 percent combined $H_2O$, 0.3 percent $Na_2O$, 0.02 percent CaO, 0.01 percent $SiO_2$ and having a specific gravity of 2.42, the aluminum trihydrate being present in a proportion of 90 to 110 parts by weight per 100 parts by weight of the polyorganosiloxanes. The amount of filler may be increased within the range to improve the desired properties.

The composition also contains about 0.5 to 5 weight percent of an amorphous $SiO_2$ reinforcing filler having a surface area of between about 100 to 250 m$^2$/g and a particle size range between about 0.01 and 0.03 microns. The specific gravity of the filler is preferably about 2.2

The composition also contains about 1 to 7 weight percent, preferably 2 to 5 weight percent of an oximinosilane cross linking agent. Preferably the oximinosilane cross linking agent is of the formula $RSi(ON=CR'_2)_3$ in which R and R' each represent a monovalent alkyl or alkylene radical having 1 to 8 carbon atoms or a phenyl radical, preferably an alkyl radical such as methyl, ethyl, propyl, butyl, or an alkylene radical such as vinyl, alkyl, or a phenyl radical. The preferred R and R' are alkyl or vinyl radicals, most preferably methyl and ethyl radicals.

The composition also contains about 0.2 to 3 weight percent of an organo functional silane as an adhesion promoter. Preferably the organo functional silane has the formula $$(R^2O)_{3-b}SiR^1{}_{}^{R^3{}_b}$$

wherein $R^2$ and $R^3$ are independently selected from monovalent alkyl or alkylene radicals being 1 to 8 carbon atoms or a phenyl radical, b is an ** from 0 to 3, preferably 0, and $R^1$ is a saturated, unsaturated or aromatic hydrocarbon radical being 1 to 10 carbon atoms, which may be further functionalized by a member selected from the group consisting of amino, ether, epoxy, isocyanate, cyano, acryloxy and acyloxy and combinations thereof. $R^2$ and $R^3$ are preferably an alkyl radical such as, for example, methyl, ethyl, propyl, butyl, or an alkylene radical such as vinyl and alkyl. More preferably $R^2$ and $R^3$ are alkyl radicals, most preferably methyl, ethyl or propyl radicals. Preferably $R^1$ is an alkyl group, more preferably further functionalized by one or more amino group. The most preferred organo-functional silane is N-(2-aminoethyl-3-aminopropyl)trimethoxysilane.

In all of the above compounds, the alkyl includes straight, branched or cyclic radicals. Among the alkyl groups are $C_{1-8}$ straight or branched-chain alkyl such as, for example, methyl, ethyl, propyl, isopropyl, n-butyl, isobutyl, tert-butyl, pentyl, isopentyl, hexyl, etc., the cycloalkyl are $C_{3-8}$ cycloalkyl such as, for example, cyclopropyl, cyclobutyl, cyclohexyl, etc., the alkylene groups are $C_{1-8}$ alkylene such as, for example, vinyl and alkyl. The above groups as well as the phenyl radicals may be further functionalized by including in the chain or ring structure, as the case may be, a group selected from the class consisting of amino, ether, epoxy, isocyanate, cyano, acryloxy, acyloxy and combinations, so long as the functionalization does not adversely affect the desired properties of the compound.

The composition additionally contains about 0.02 to 3 weight percent of an organotin salt of a carboxylic acid as a condensation catalyst, which accelerate the aging of the composition. Preferably the organotin salt is selected from the group dibutyltin diacetate, stannous octoate, dibutyltin dioctoate and dibutyltin dilaurate.

Most preferably the organotin salt is dibutyltin dilaurate of the formula:

$$(C_4H_9)_2Sn(OCOC_{10}H_{20}CH_3)_2.$$

The composition may contain other optional ingredients such as pigments and other fillers in minor amounts provided that the addition of the ingredients does not cause degradation of the desired properties of the cured coating made from the composition. One commonly utilized optional ingredient is a pigment, preferably a gray pigment, most preferably present in amounts up to about 1 weight percent.

The organopolysiloxane composition of the present invention is prepared by mixing the ingredients together in the absence of moisture. The silane is moisture sensitive and will undergo cross-linking in the presence of moisture such that the mixture must be essentially absent of free moisture when the silane is added and maintained in a moisture free state until cure is desired.

A preferred method of mixing comprises mixing the polysiloxane fluids with the extending and reinforcing fillers and other optional fillers and pigments. Thereafter, the oximinosilane and organo-functional silane are added and mixed under a nitrogen atmosphere. The organotin salt is added to the mixture and the mixture is then dispensed in sealed containers for storage prior to use.

The surface to be protected is coated with the composition by conventional methods such as dipping, brushing or spraying. Preferably, the surface to be protected is coated by spraying one or more applications of the composition of the present invention. The thickness of the coating will depend upon the specific requirements of the application and the desired level of protection. The coating generally has an average thickness of 250 to 1500 microns more preferably, an average thickness of 500 to 1000 microns, most preferably about 500 to 750 microns After the coating is formed on the surface, the surface is exposed to normal atmosphere for cross-linking and cure of the coating.

The improved coating of the present invention is capable of protecting surfaces from environmental effects including metal and concrete surfaces from corrosion in the presence of moisture such as rain or fog in combination with contaminated atmospheres, salt spray or fog or direct exposure to salt water.

The improved coating of the present invention is particularly useful for protecting metal surfaces which are directly exposed to salt water. Such surfaces include the hulls of ships and other vessels, oil drilling rigs, harbour and pier structures, etc. When the coating is used on the hulls of ships, further benefits such anti-fouling in addition to the corrosion protection are achieved. The coating does not allow marine animals, such as barnacles, to easily attach to the surface. Any such animals which attempt to attach to the surface are generally removed from the surface by high pressure washers. Additionally, clean up of the surface is generally accomplished by high pressure wash and/or hand or mechanical wiping and does not require the scraping operations commonly utilized during hull cleaning of ships, or other marine installations. As clean up of surfaces coated with the composition of the present invention is easily accomplished, the composition can also be used as an anti-graffiti coating on surfaces.

The following examples are included to illustrate preferred embodiments of the invention and to demonstrate the usefulness of the coating and are not intended to limit in any way the scope of protection for the invention.

EXAMPLE 1

To 36 parts by weight of dimethyl polysiloxane fluid having a viscosity of 16,750 centipoise at 25° C. and 22 parts by weight of dimethyl siloxane cyclic is added 35 parts by weight of a mixture of amorphous and crystalline silica fillers having a specific gravity of 2.2 and surface area of about 130 m$^2$/g. Then 2 parts by weight of pigment is added and the composition is mixed in a mixer to a uniform consistency. Then 3 parts by weight of methyl tris-(methyl ethyl ketoxime) silane and 1 part by weight of N-(2-aminoethyl-3 aminopropyl) trimethoxysilane are added and mixed under a nitrogen atmosphere. Finally, 0.1 part of dibutyltin dilaurate is added to the dispersion and mixed until a uniform consistency is achieved.

Coupon samples prepared from stainless and carbon steel and aluminum sheet were coated with the composition prepared according to Example 1 by dipping into the mixture and exposing the samples to normal atmosphere for crosslinking. The coupon samples, having an average coating thickness of 300 microns, were exposed to salt-fog testing in an electrical (ozone producing) environment. After 2000 hours of continuous exposure, the coating showed no evidence of deterioration or separation from the virgin metal surfaces. Uncoated samples of both metals showed severe etching and corrosion.

Carbon steel sheet samples were coated with the composition according to Example 1 by dipping into the mixture and exposing the samples to normal atmosphere for crosslinking. The samples, having an average coating thickness of 320 microns, were exposed to accelerated heat aging at 260° C. After 7 days of continuous exposure, the coating showed no evidence of deterioration or separation from the virgin metal surface.

Carbon steel coupons coated with the composition of Example 1 to a thickness of 500 microns were immersed 30 days in an algae producing environment of ocean water at room temperature. Considerable deposits of algae were present which were easily removed by wiping with a damp cloth. The original surface of the coating showed no changes, scratches or deformations.

The improved flexibility of the coating and its resistance to cracking was confirmed utilizing carbon steel coupons coated with 300 microns thick coating. The samples were bent 180° along a curve showed no cracks or separation from substrate.

EXAMPLE 2

A composition useful for high temperature protection was prepared by using 37 parts by weight of dimethyl polysiloxane fluid having a viscosity of 3,300 centipoise at 25° C. and 20 parts of dimethyl siloxane cyclics and 4 parts by weight of titanium dioxide was then added. Then 3 parts by weight of methyl tris-(methyl ethyl ketoxime) silane, 1 part by weight of N-(2-aminoethyl-3 aminopropyl) trimethoxysilane and 0.05 part by weight of dibutyltin dilaurate are added under a nitrogen atmosphere. Then 32 parts by weight of mixture of amorphous and crystalline silica fillers having a specific gravity of 2.2 and surface area of 150 m$^2$/g was added. Finally, 6 parts by weight of melamine was added and mixed well to uniform consistency.

Adhesion tests of the above formulation were performed by applying a thin coating on the stainless steel, carbon steel, aluminum, wood and glass. The coating was cured at standard conditions (room temperature 25° C. and 50 relative humidity) for 7 days and then peeled by applying a cut on the surface. The coating exhibited excellent adhesion of all tested materials.

Several sheets of 200-micron thickness were prepared from the above product and cured for 7 days at standard conditions. Physical properties, such as elongation, tensile stress, tear resistance and hardness of the each sheet were tested before and after immersion into engine oils at 150° C. e.g. Mobile 10W-30, Valvoline 10W-30 and automatic transmission fluid. No degradation or significant decrease in any physical property was observed. The product showed excellent oil resistance at elevated temperature.

Results of Oil Resistance Test of the Cured Product

| Sample | Elongation at break (%) | Tensile Strength (psi) | Durometer Hardness Shore A (points) | Tear Resistance (ppi) |
|---|---|---|---|---|
| Cured at standard conditions for 7 days | 183 | 309 | 56 | 36 |
| The cured sheet subjected to oil immersion for 70 hours at 150° C. Mobile 10W-30 | 180 | 290 | 50 | 22 |
| The cured sheet subjected to oil immersion for 70 hours at 150° C. Automatic Transmission Fluid | 180 | 274 | 48 | 25 |

The formulation was also tested for flame retardancy by Underwriter Laboratories Inc. (UL 94-V-0) and the product successfully passed the flame retardancy test.

EXAMPLE 3

A first composition for coating electrical insulators was prepared by mixing 30 parts by weight of dimethyl polysiloxane fluid having a viscosity of 20,000 centipoise at 25° C. and 20 parts by weight of cyclic dimethyl siloxane then adding 2 parts by weight of amorphous silica having a specific gravity of 2.2 and surface area of about 150 m²/g. Then 2 parts by weight of methyl tris- (methyl ethyl ketoxime) silane and 1 part by weight of N-(2-aminoethyl-3 aminopropyl) trimethoxy silane are added and mixed under nitrogen atmosphere. Then 35 parts by weight of alumina trihydrate are added and mixed well to uniform consistency. The viscosity and sag of the mixture was checked and adjusted to 1000±300 centipoise and 35±10 on Leneta Scale by adding extra amount of dimethoxy polysiloxane cyclics and amorphous silica respectively. Finally, 0.1 part by weight of dibutyltin dilaurate is Added and mixed thoroughly.

EXAMPLE 4

A second electrical insulator coating composition was prepared by mixing 30 parts by weight of dimethyl polysiloxane fluid having a viscosity of 20,000 centipoise at 25° C. and 29 parts by weight of linear dimethyl polysiloxane of viscosity of 50 centipoise at 25° C., then adding 2 parts by weight of amorphous silica having a specific gravity of 2.2 and surface area of about 150 m²/g. Then 2 parts by weight of methyl tris-(methyl ethyl ketoxime) silane and 1 part by weight of N-(2-aminoethyl-3 aminopropyl) trimethoxy silane are added and mixed under nitrogen atmosphere. Then 35 parts by weight of alumina trihydrate are added and mixed well to uniform consistency. The viscosity and sag of the mixture was checked and adjusted to 1000±300 centipoise and 35±10 on Leneta Scale by adding extra amount of dimethoxy polysiloxane linears and amorphous silica respectively. Finally, 0.1 part by weight of dibutyltin dilaurate is added and mixed thoroughly.

EXAMPLE 5

A composition useful for protection against cathodic disbondment was prepared by using 36 parts by weight of dimethyl polysiloxane fluid is having a viscosity of 20000 centipoise at 25° C. and 20 parts by weight of polydimethyl siloxane cyclics and 32 parts by weight of a mixture of amorphous and crystalline silica having a specific gravity of 2.2 and a surface area of 130 m²/g. Then 2 parts by weight of pigment and 3 parts by weight of Zinc powder of specific gravity of 7.12 and average particle size of 5 μ was added and composition is mixed in a mixer to a uniform consistency. Then 3 parts by weight of methyl tris-(methylethyl ketoxime) silane and 1 part by weight of N-(2-aminoethyl-3 aminopropyl) trimethoxysilane are added and mixed under a nitrogen atmosphere. Finally 0.1 parts by weight of dibutyltin dilaurate is added to the mixture and mixed until a uniform consistency is achieved.

CATHODIC DISBONDMENT TEST

Coupons of carbon steel were coated with the composition prepared according to the example by dipping into the mixture. The coupons were suspended in a glass container containing 3% NaCl solution. A negative potential of 1.5 Volts was applied on the coated coupons and the actual potential was measured by using a Standard Calomel Electrode. The test was continued for 60 days and data was recorded on daily basis. No bubble formation or disbandment or degradation was observed.

Compositions of the present invention are also useful for protecting other types of surfaces from corrosive environments. For example, compositions of the present invention are particularly useful for protecting surfaces for spillage containment around tank farms and the like. The composition may be coated onto a heavy-duty fabric which is then utilized to line the interior of the spillage catch basins around the tank farm. Samples of heavy-duty Geo fabric were sprayed with the composition of the present invention to coat the fabric. Treated and untreated samples of fabric were exposed to caustic soda solution, diesel oil, furnace oil by placing samples of these materials on the surface of the fabric for up to seven days. No deterioration of the treated fabric was observed and the deposits of the material were easily able to be cleaned up without any noticeable loss of weight of the material. In contrast, untreated fabric did not retain the material on the surface and the caustic soda solution caused deterioration of the untreated fabric material within 24 hours.

The compositions of the present invention are useful in many instances where protection of surfaces against environmental effects is desired. These compositions include the composition of the above examples as well as other compositions, the formulation of which is well within the skill of the ordinary workman in the art. The selection of the various components and their proportions would be immediately apparent depending upon the desired properties of the final coating. The compositions of the present invention overcome many of the problems associated with prior art compositions being a one part coating composition, which is easy to apply to surfaces with minimal preparation, avoiding the need for scribing, etching, profiling and blasting, solvent treatment and/or prime coatings with other adhesive, non-silicone coatings etc. The composition may be applied using any of the commonly employed methods and are VOC free, thus satisfying the elimination or reduction in environmental pollution and potential danger to the health of workers caused by VOC containing compositions.

While the invention has been described in reference to specific embodiments it should be understood by those skilled in the art that various changes can be made and equivalents may be substituted without departing from the true spirit and scope of the invention. All such modifications are intended to be within the scope of the claims appended hereto.

The Embodiments of the invention in which an exclusive property or privilege is claimed are as follows:

1. A one-part organopolysiloxane rubber composition for use as a protection coating to protect a surface against environmental effects comprising the product which is obtained by mixing the following:

a) from about 20 to about 50 weight percent of one or more polydiorganosiloxane fluids of the formula

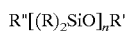
    R"[(R)$_2$SiO]$_n$R' in which R is a monovalent alkyl or alkylene radical having 1 to 8 carbon atoms or a phenyl radical, R' is a monovalent alkyl or alkylene radical having 1 to 8 carbon atoms or a phenyl radical, R" is OH or a monovalent alkyl or alkylene radical having 1 to 8 carbon atoms or a phenyl radical and n has an average value such that the viscosity is from about 1 to about 100,000 centipoise at 25° C., wherein at least one of the polyorganosiloxane fluid has R" equal to OH and n has an average value such that the viscosity is in the range from 1,000 to 100,000 centipoise at 25° C., preferably from 3,000 to 40,000 centipoise at 25° C.;

b) from 0 to about 40 weight percent of a cycloorganosiloxane of the formula

[(R)$_2$SiO]$_n$ in which R is a monovalent alkyl or alkylene radical having 1 to 8 carbon atoms or a phenyl radical which may optionally be substituted with an alkyl radical having 1 to 8 carbon atoms and n has an average value of 3 to 10;

c) from 0 to about 40 weight percent of an inorganic extending or non-reinforcing filler;

d) from about 0.5 to about 10 weight percent of an amorphous SiO$_2$ reinforcing filler having a surface area of between about 100 to 250 m$^2$/g and a particle size range between about 0.01 and 0.03 microns;

e) from about 1 to about 7 weight percent of an oximinosilane cross-linking agent of the formula;

    RSi(ON=CR'$_2$)$_3$ in which R and R' are independently selected from monovalent alkyl or alkylene radicals having 1 to 8 carbon atoms or a phenyl radical which may optionally be substituted with an alkyl radical having 1 to 8 carbon atoms;

f) from about 0.2 to about 3 weight percent of an adhesion promoter of the formula

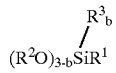
    (R$^2$O)$_{3-b}$SiR$^1$ / R$^3_b$ in which R$^2$ and R$^3$ are independently selected from monovalent alkyl or alkylene radicals having 1 to 8 carbon atoms or a phenyl radical which may optionally be substituted with an alkyl radical having 1 to 8 carbon atoms, b is an integer between 0 and 3, and R$^1$ is a saturated, unsaturated or aromatic hydrocarbon radical having 1 to 10 carbon atoms which may optionally contain a functional group; and g) from about 0.02 to about 3 weight percent of an organotin salt as a condensation catalyst.

2. A composition according to claim 1 wherein the composition contains only one polyorganosiloxane fluid in which R and R' are each alkyl and from about 20 to about 30 weight percent of the cycloorganosiloxane.

3. A composition according to claim 2 wherein R and R" are methyl.

4. A composition according to claim 3 wherein the adhesion promoter is a compound of the formula

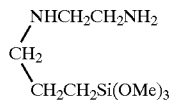
NHCH$_2$CH$_2$NH$_2$ / CH$_2$ \ CH$_2$CH$_2$Si(OMe)$_3$ wherein Me is the methyl radical.

5. A composition according to claim 4 wherein the organotin salt is an organotin salt of a carboxylic acid selected from the group consisting of dibutyltindiacetate, stannous octoate and dibutyltin dioctoate.

6. A composition according to claim 5 wherein the organotin salt of a carboxylic acid is a compound of the formula

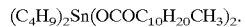
(C$_4$H$_9$)$_2$Sn(OCOC$_{10}$H$_{20}$CH$_3$)$_2$.

7. A composition according to claim 6 wherein the inorganic extending or non-reinforcing filler is one or more materials selected from calcium carbonate, barium sulfate, iron oxide, diatomaceous earth, melamine, quartz, crystalline silica, titanium dioxide, alumina trihydrate, zinc oxide, zirconium oxide, chromic oxide, zinc powder, nickel powder, copper powder, carbon black and graphite.

8. A composition according to claim 7 wherein the inorganic extending or non-reinforcing filler is a combination of about 0.5 to about 5.0 weight percent of crystalline silica and about 36 to about 48 weight percent of alumina trihydrate, the alumina trihydrate having a median particle size of 13 μm, containing 65.1 percent Al$_2$O$_3$, 34.5 percent combined H$_2$O, 0.3 percent Na$_2$O, 0.02 percent Cao, 0.01 percent SiO$_2$ and having a specific gravity of 2.42, the aluminum trihydrate being present in a proportion of 90 to 110 parts by weight per 100 parts by weight of the polyorganosiloxanes.

9. A composition according to claim 7 wherein the inorganic extending or non-reinforcing filler is one or more materials selected from melamine, iron oxide, zinc oxide, titanium dioxide, zirconium oxide or zinc chromate.

10. A composition according to claim 9 wherein the inorganic extending or non-reinforcing filler is melamine.

11. A composition according to claim 7 wherein the inorganic extending or non-reinforcing filler is combination of 5 to about 40 weight percent of crystalline silica and about 0.25 to 10 weight percent of a conductive filler such as zinc, nickel, copper, carbon black or graphite powder of average particle size of 3 to 10 $\mu$m and having a specific gravity of 7.12 The proportion of conductive filler to the polymer is 1 to 27 parts by weight per 100 parts by weight of polyorganosiloxanes.

12. A composition according to claim 1 comprising:
    a) about 36 weight percent of a hydroxyl terminated dimethyl polysiloxane fluid having a viscosity of 10,000 to 20,000 Centipoise at 25° C.;
    b) about 35 weight percent of a mixture of amorphous and crystalline $SiO_2$ fillers having a specific gravity of 2.2 and surface area of up to about 130 $m^2/g$;
    c) about 3 weight percent of methyl tris-(methyl ethyl ketoxime) silane;
    d) about 1 weight percent of N-(2 aminoethyl-3 aminopropyl)trimethoxysilane;
    e) about 0.1 weight percent of dibutyltindilaurate;
    f) about 22 weight percent of dimethylsiloxane cyclics; and
    g) about 0.8 weight percent of a gray pigment.

13. A composition according to claim 1 wherein the composition contains a first polydiorganosiloxane fluid wherein R and R' are each alkyl, R" is OH and n has an average value such that the viscosity is from about 3000 to 30,000 centipoise at 25° C. and a second polydiorganosiloxane fluid wherein R, R' and R" are each alkyl and the average volume of n is between 4 and 20.

14. A composition according to claim 13 wherein R and R' of the first polydiorganosiloxane and R, R' and R" of the second polydiorganosiloxane are all methyl.

15. A composition according to claim 14 wherein the adhesion promoter is a compound of the formula

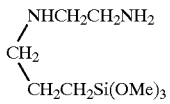

wherein Me is the methyl radical.

16. A composition according to claim 15 wherein the organotin salt of a carboxylic acid is a compound of the formula

17. A composition according to claim 16 wherein the inorganic extending or non-reinforcing filler is one or more materials selected from calcium carbonate, barium sulfate, iron oxide, diatomaceous earth, melamine, quartz, crystalline silica, titanium dioxide, alumina trihydrate, zinc oxide, zirconium oxide and chromic oxide.

18. A composition according to claim 17 wherein the inorganic extending or non-reinforcing filler is a combination of about 0.5 to about 5.0 weight percent crystalline silica and about 36 to about 48 weight percent of alumina trihydrate, the alumina trihydrate having a median particle size of 13 $\mu$m, containing 65.1 percent $Al_2O_3$, 34.5 percent combined $H_2O$, 0.3 percent $Na_2O$, 0.02 percent CaO, 0.01 percent $SiO_2$ and having a specific gravity of 2.42, the aluminum trihydrate being present in a proportion of 90 to 110 parts by weight per 100 parts by weight of the polyorganosiloxanes.

19. A method of protecting a surface from the effects of a corrosive environment comprising
    (1) applying to the surface a thin layer of a one-part organopolysiloxane rubber composition comprising the product which is obtained by mixing the following:
    a) from about 20 to about 98 weight percent of one or more polydiorganosiloxane fluids of the formula

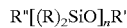

in which R is a monovalent alkyl or alkylene radical having 1 to 8 carbon atoms or a phenyl radical, R' is a monovalent alkyl or alkylene radical having 1 to 8 carbon atoms or a phenyl radical, R" is OH or a monovalent alkyl or alkylene radical having 1 to 8 carbon atoms or a phenyl radical and n has an average value such that the viscosity is from about 1 to about 100,000 centipoise at 25° C., wherein at least one of the polyorganosiloxane fluid has R" equal to OH and n has an average value such that the viscosity is in the range from 1,000 to 100,000 centipoise at 25° C., preferably from 3,000 to 40,000 centipoise at 25° C.;
    b) from 0 to about 40 weight percent of a cyclo-organosiloxane of the formula

in which R is a monovalent alkyl or alkylene radical having 1 to 8 carbon atoms or a phenyl radical which may optionally be substituted with an alkyl radical having 1 to 8 carbon atoms and n has an average value of 3 to 10
    c) from 0 to about 40 weight percent of an inorganic extending or non-reinforcing filler
    d) from about 0.5 to about 10 weight percent of an amorphous $SiO_2$ reinforcing filler having a surface area of between about 100 to 250 $m^2/g$ and a particle size range between about 0.01 and 0.03 microns;
    e) from about 1 to about 7 weight percent of an oximinosilane cross-linking agent of the formula;

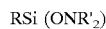

in which R and R' are independently selected from monovalent alkyl or alkylene radicals having 1 to 8 carbon atoms or a phenyl radical which may optionally be substituted with an alkyl radical having 1 to 8 carbon atoms;
    f) from about 0.2 to about 3 weight percent of an adhesion promoter of the formula

    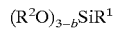

in which $R^2$ and $R^3$ are independently selected from monovalent alkyl or alkylene radicals having 1 to 8 carbon atoms or a phenyl radical which may optionally be substituted with an alkyl radical having 1 to 8 carbon atoms, b is an integer between 0 and 3, and $R^1$ is a saturated, unsaturated or aromatic hydrocarbon radical having 1 to 10 carbon atoms which may optionally contain a functional group; and
    g) from about 0.02 to about 3 weight percent of an organotin salt as a condensation catalyst;
    and
    (2) allowing the layer of the one-part organopolysiloxane rubber composition to cure at room temperature to a silicone elastomer.

20. A method according to claim 19 wherein the one part organopolysiloxane rubber composition comprises:
    a) about 35 weight percent of a hydroxyl terminated dimethyl polysiloxane fluid having a viscosity of 10 Centipoise at 25° C.;

b) about 35 weight percent of a mixture of amorphous and crystalline $SiO_2$ fillers having a specific gravity of 2.2 and surface area of up to about 130 $m^2/g$;

c) about 4.3 weight percent of methyl tris-(methyl ethyl ketoxime)silane;

d) about 2.2 weight percent of N-(2 aminoethyl-3 aminopropyl)trimethoxysilane;

e) about 0.8 weight percent of dibutyltindilaurate;

f) about 22 weight percent of petroleum based solvent; and g) about 0.8 weight percent of a gray pigment.

* * * * *